United States Patent
Van'tZelfde et al.

(10) Patent No.: US 9,248,851 B2
(45) Date of Patent: Feb. 2, 2016

(54) STEERING WHEEL HAND DETECTION SYSTEMS

(71) Applicant: TK Holdings, Inc., Auburn Hills, MI (US)

(72) Inventors: Dwayne Van'tZelfde, Holly, MI (US); Valerie Dawn Gardner, St. Clair Township, MI (US); Jason Carl Lisseman, Shelby Township, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 14/178,578

(22) Filed: Feb. 12, 2014

(65) Prior Publication Data

US 2014/0224040 A1     Aug. 14, 2014

Related U.S. Application Data

(60) Provisional application No. 61/764,265, filed on Feb. 13, 2013.

(51) Int. Cl.
*G01L 1/00* (2006.01)
*B62D 1/04* (2006.01)
(Continued)

(52) U.S. Cl.
CPC .............. *B62D 1/046* (2013.01); *B60W 40/08* (2013.01); *B62D 1/065* (2013.01); *G01L 1/00* (2013.01); *G01L 1/205* (2013.01)

(58) Field of Classification Search
CPC ......... B60W 40/08; G01L 1/00; G01L 1/205; B62D 1/046
USPC ................ 73/862.391, 862.041–46, 862.381, 73/862.041–862.046
See application file for complete search history.

(56) References Cited

U.S. PATENT DOCUMENTS

| | | |
|---|---|---|
| 3,585,626 A | 6/1971 | Tartarini |
| 6,016,103 A | 1/2000 | Leavitt |

(Continued)

FOREIGN PATENT DOCUMENTS

| | | |
|---|---|---|
| JP | 61-146671 | 7/1986 |
| JP | 2008-059459 | 3/2008 |

(Continued)

OTHER PUBLICATIONS

International Search Report and Written Opinion in corresponding International Application No. PCT/US2014/016023, dated May 23, 2014 (14 pages).

(Continued)

*Primary Examiner* — Max Noori
(74) *Attorney, Agent, or Firm* — Meunier Carlin & Curfman LLC

(57) ABSTRACT

Steering wheel hand detection systems are disclosed herein. The systems can optionally be used with a system for identifying the presence and/or location of a driver's hands on the steering wheel. The systems include a sensor mat including a plurality of sensor loops arranged in the steering wheel to achieve multiple sensing zones. Because the systems include a sensor mat including a plurality of sensor loops, the systems can be implemented in steering wheels having different designs. The systems can also be implemented to achieve different numbers and/or types (e.g., tap detection, swipe detection, grip detection, etc.) of sensing zones. Additionally, the systems can be implemented in a way that reduces the likelihood of crosstalk due to wire routing.

30 Claims, 10 Drawing Sheets

(51) Int. Cl.
  *B60W 40/08*   (2012.01)
  *B62D 1/06*    (2006.01)
  *G01L 1/20*    (2006.01)

(56) References Cited

U.S. PATENT DOCUMENTS

| | | | |
|---|---|---|---|
| 6,172,610 B1 | 1/2001 | Prus | |
| 6,590,499 B1 | 7/2003 | D'Agosto | |
| 6,661,345 B1 | 12/2003 | Bevan | |
| 7,688,213 B2 | 3/2010 | Power | |
| 7,830,265 B2 | 11/2010 | Power | |
| 8,983,732 B2* | 3/2015 | Lisseman | B60K 28/066 701/45 |
| 2003/0074092 A1 | 4/2003 | Carrabis | |
| 2004/0212189 A1 | 10/2004 | Kachu | |
| 2008/0042856 A1 | 2/2008 | Power | |
| 2010/0102972 A1 | 4/2010 | Middlekauff et al. | |
| 2010/0130808 A1 | 5/2010 | Hattori | |
| 2011/0115617 A1 | 5/2011 | Bennett | |
| 2011/0133919 A1* | 6/2011 | Evarts et al. | 340/439 |
| 2011/0241850 A1 | 10/2011 | Bosch et al. | |
| 2011/0246028 A1* | 10/2011 | Lisseman et al. | 701/45 |
| 2011/0257846 A1* | 10/2011 | Bennett | 701/45 |
| 2012/0126965 A1* | 5/2012 | Sanma et al. | 340/438 |
| 2012/0179328 A1 | 7/2012 | Goldman-Shenhar | |
| 2012/0232751 A1 | 9/2012 | Guspan | |
| 2012/0296528 A1* | 11/2012 | Wellhoefer et al. | 701/48 |
| 2012/0326735 A1 | 12/2012 | Bennett et al. | |
| 2014/0054880 A1 | 2/2014 | Feinstein | |

FOREIGN PATENT DOCUMENTS

| | | |
|---|---|---|
| JP | 2010-026610 | 2/2010 |
| JP | 2011063103 | 3/2011 |

OTHER PUBLICATIONS

International Preliminary Report on Patentability and Written Opinion, dated Aug. 18, 2015, received in connection with PCT/US2014/016023.

Office Action, dated Jun. 30, 2015, received in connection with JP Application No. 2011-082736. (English Translation).

Office Action, dated Nov. 4, 2014, received in connection with JP Application No. 2011-082736. (English Translation).

U.S. Appl. No. 13/078,793, filed Apr. 1, 2011 (U.S. Pat. No. 8,983,732, issued Mar. 17, 2015).

Notice of Allowance, dated Nov. 3, 2014, received in connection with U.S. Appl. No. 13/078,793, filed Apr. 1, 2011 (U.S. Pat. No. 8,983,732, issued Mar. 17, 2015).

Non Final Office Action in U.S. Appl. No. 13/078,793 mailed Dec. 6, 2012.

Final Office Action in U.S. Appl. No. 13/078,793 mailed Mar. 15, 2013.

Final Office Action in U.S. Appl. No. 13/078,793 mailed Jun. 3, 2013.

Non Final Office Action in U.S. Appl. No. 13/078,793 mailed Dec. 16, 2013.

Final Office Action in U.S. Appl. No. 13/078,793 mailed May 6, 2014.

* cited by examiner

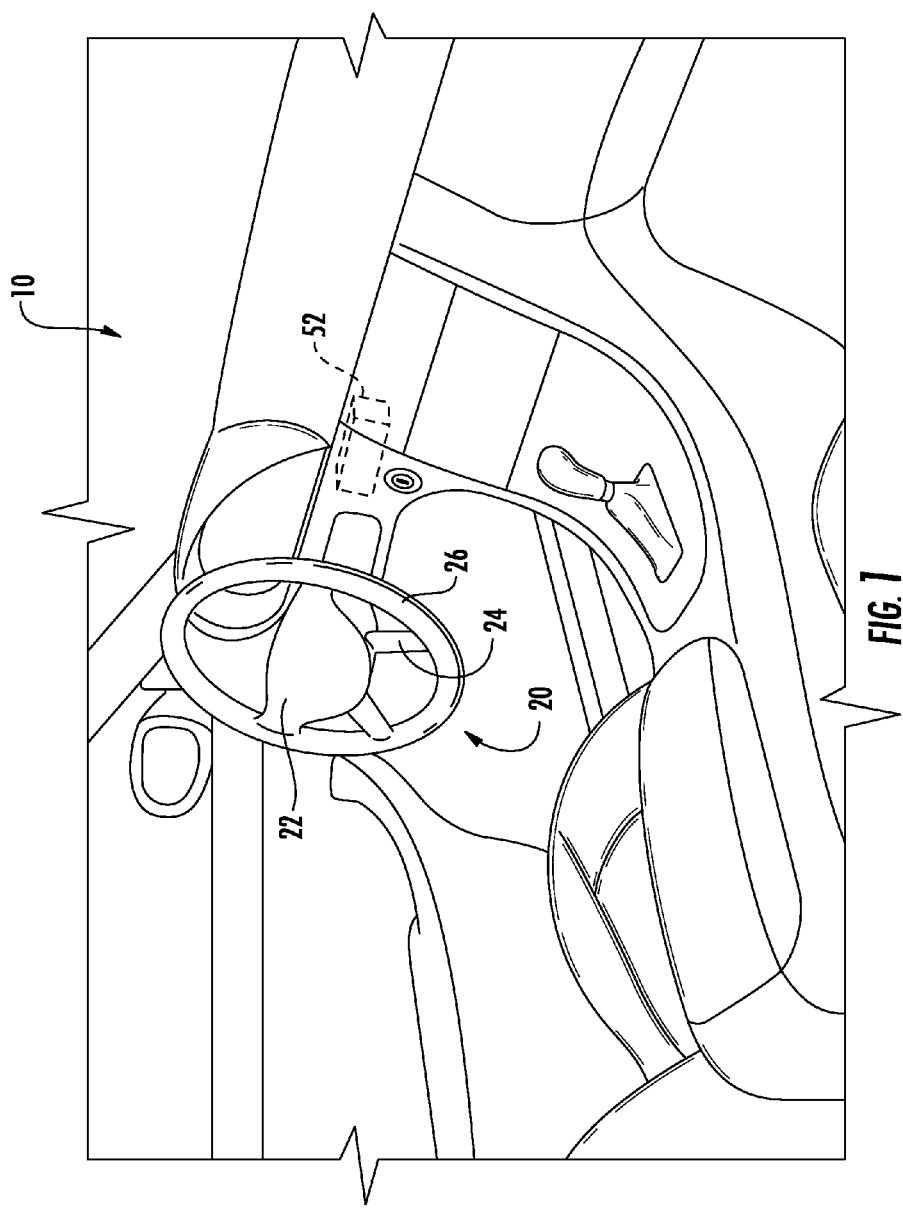

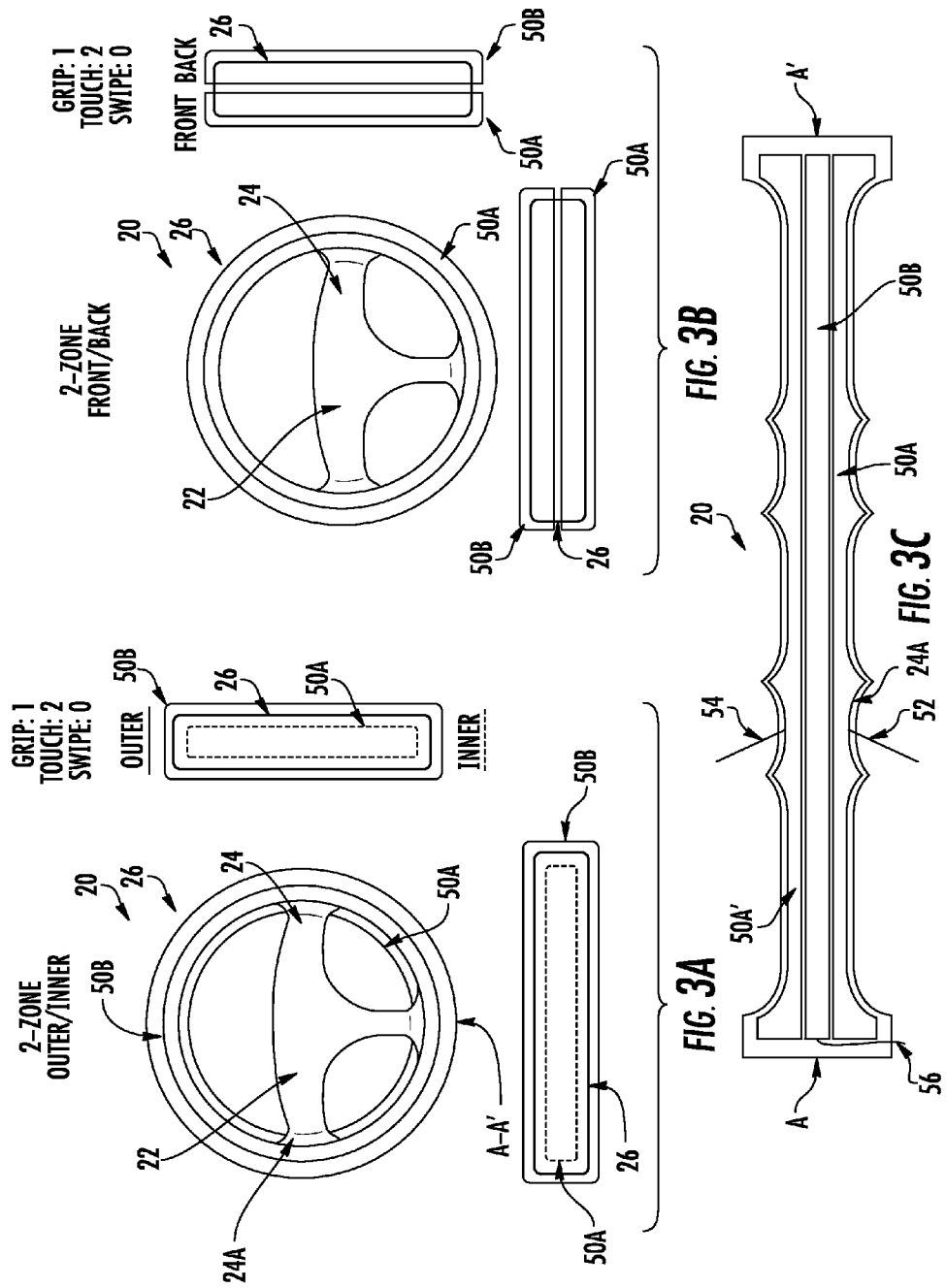

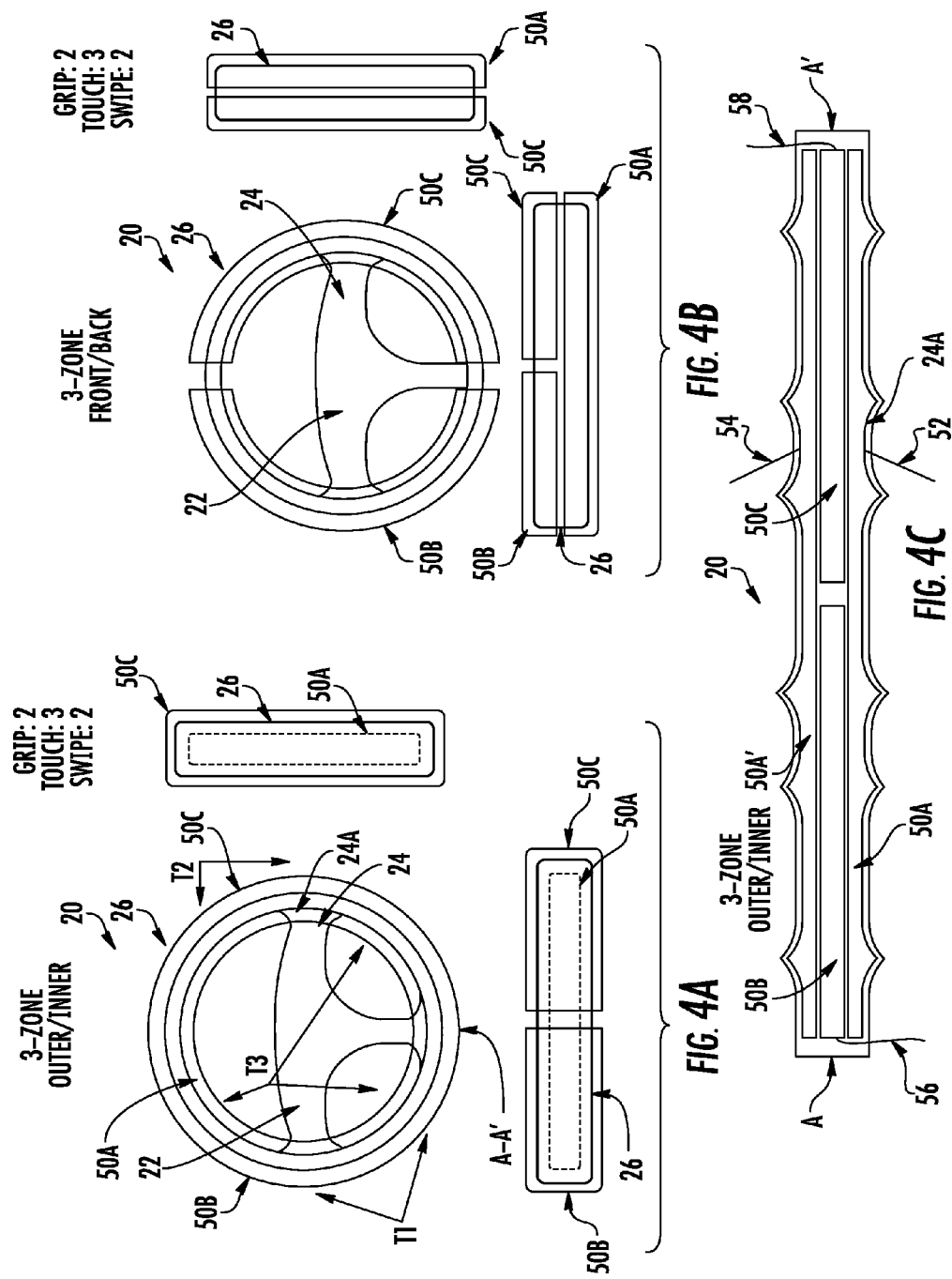

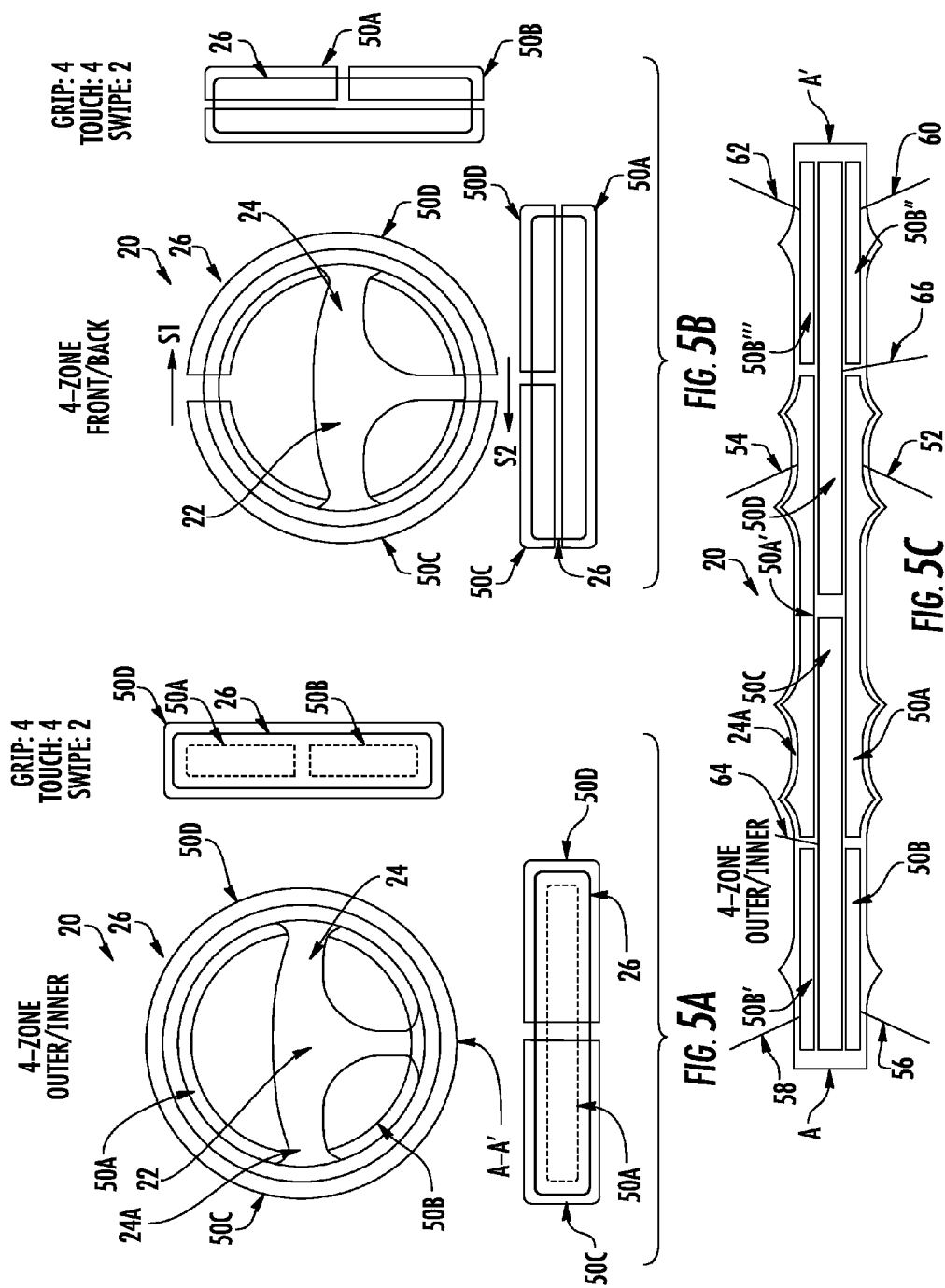

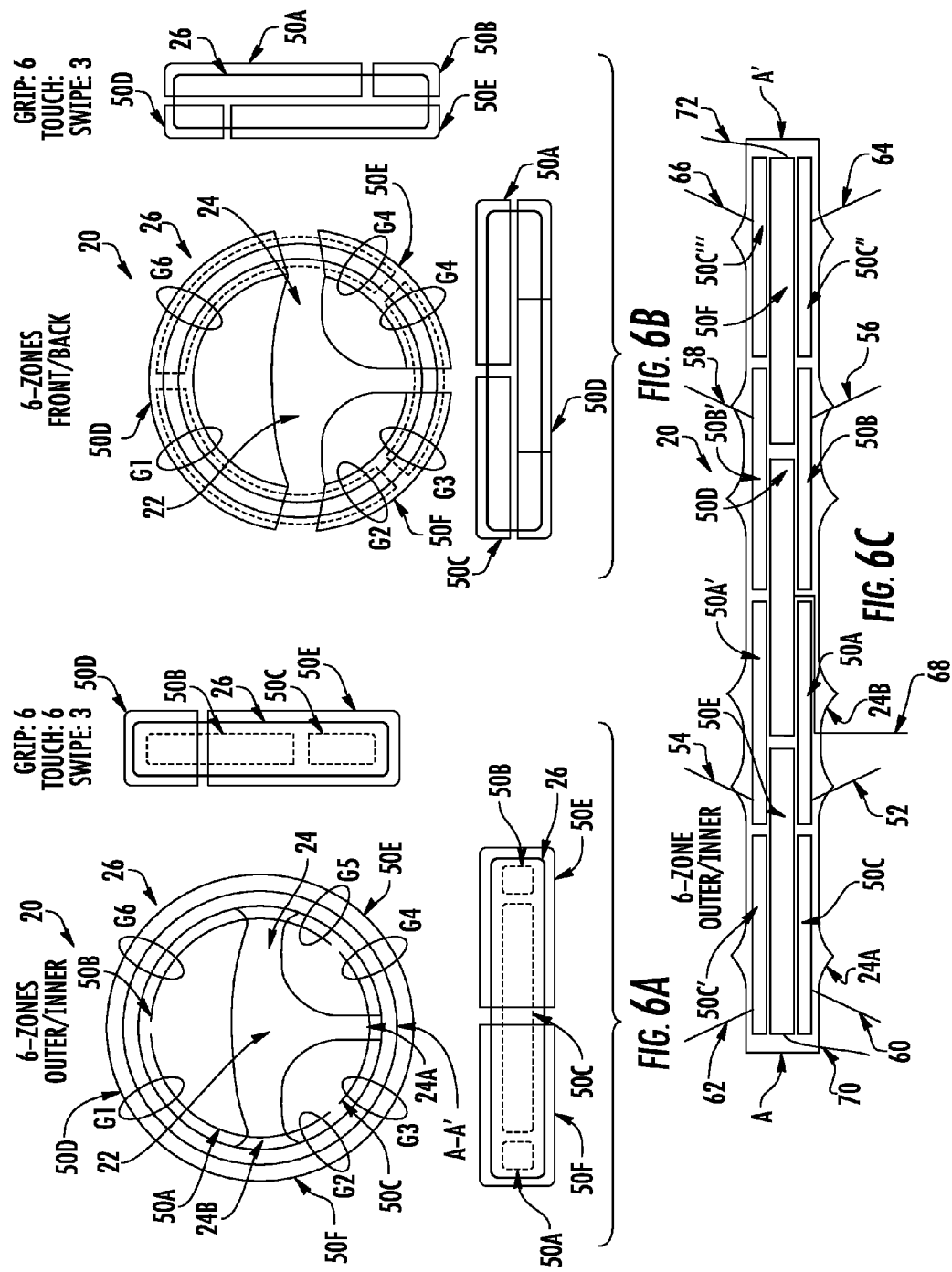

STEERING WHEEL HAND DETECTION SYSTEMS

RELATED APPLICATIONS

This application claims priority to U.S. Provisional Patent Application No. 61/764,265, filed Feb. 13, 2013, entitled "STEERING WHEEL HAND DETECTION SYSTEMS," which is incorporated herein by reference in its entirety.

BACKGROUND

The present invention relates generally to the field of steering wheels. More specifically, it relates to a system for sensing the presence of a driver's hands on the steering wheel.

Conventional steering wheels do not have the capability of detecting the drivers hand position during vehicle operation. In normal driving conditions both hands should be present on the steering wheel to be in full, safe control of the vehicle, following the "hands on the wheel, eyes on the road, mind on the drive" safety mantra.

In recent times, the number of potential distractions for a driver has increased. With the advent of portable electronics (e.g., mobile phones, mp3 players, etc.), there are a number of electronic distractions that encourage or tempt drivers to take their hands off the steering wheel. For example, such portable electronics can require manually dialing or selecting a phone number in order to make a cell phone call, or manually texting messages and/or answering emails, or selecting which song to play on an attached MP3 player.

It would be desirable to provide a system for identifying the presence and/or location of a driver's hands on the steering wheel to allow for vehicle based warnings and inputs for other vehicle and steering wheel based systems.

SUMMARY

Hand detection systems are disclosed herein. The systems can optionally be used with a system for identifying the presence and/or location of a driver's hands on a steering wheel. The systems include a sensor mat having a plurality of sensor loops arranged in the steering wheel to achieve multiple sensing zones. Because the systems include a sensor mat having a plurality of sensor loops, the systems can be implemented in steering wheels having different designs. The systems can also be implemented to achieve different numbers and/or types (e.g., tap detection, swipe detection, grip detection, etc.) of sensing zones. Additionally, the systems can be implemented in a way that reduces the likelihood of crosstalk due to wire routing.

An example hand detection system can include a steering wheel having an inner region and an outer region and, a sensor mat having a plurality of sensor loops arranged in the steering wheel. Each of the sensor loops can define a sensing zone. In addition, one or more of the sensor loops can be arranged in each of the inner and outer regions of the steering wheel. The hand detection system can also include a control unit configured to detect a driver's hand pressing a portion of the steering wheel corresponding to one or more of the sensing zones. The sensor mat can optionally include a pressure-sensitive material.

In some implementations, two or more of the sensor loops can optionally be arranged in a spaced apart pattern in at least one of the inner and outer regions. For example, two or more of the sensor loops can be arranged in the spaced apart pattern in the outer region.

Additionally, each of the sensor loops can define a touch sensing zone. Alternatively or additionally, each of the sensor loops arranged in the outer region can define a swipe sensing zone. Each of the two or more of the sensor loops arranged in the outer region can partially overlap with a portion of each of the one or more of the sensor loops arranged in the inner region. The overlapping portions of the sensor loops can define at least two grip sensing zones.

Each of the sensor loops can further include a conductive lead for communicating an electrical signal to the control unit. The conductive lead for at least one of the sensor loops can optionally be routed without extending into a portion of any of the sensing zones defined by any adjacent sensor loops.

In some implementations, two or more of the sensor loops can be arranged in a spaced apart pattern in each of the inner and outer regions.

Additionally, each of the sensor loops can define a touch sensing zone. Alternatively or additionally, each of the sensor loops arranged in the outer region can define a swipe sensing zone. At least one of the sensor loops arranged in the outer region can overlap with a portion of at least two of the sensor loops arranged in the inner region. The overlapping portions of the sensor loops can define at least two grip sensing zones.

Each of the sensor loops can further include a conductive lead for communicating an electrical signal to the control unit. The conductive lead for at least one of the sensor loops can optionally be routed without extending into a portion of any of the sensing zones defined by any adjacent sensor loops. For example, the conductive lead for the at least one of the sensor loops can be the conductive lead for at least one of the sensor loops arranged in the outer region. Optionally, the conductive lead for the at least one of the sensor loops arranged in the outer region can be routed through a space between at least two of the sensor loops arranged in the inner region. Alternatively or additionally, the conductive lead for at least one of the sensor loops can be routed through a portion of the sensing zone defined by an adjacent sensor loop. Optionally, at least a section of the conductive lead that is routed through the portion of the sensing zone can include a shielding layer.

In some implementations, a center point of the at least one of the sensor loops arranged in the outer region can optionally be positioned less than or equal to approximately 90 degrees with respect to a center point of each of the at least two of the sensor loops arranged in the inner region.

In some implementations, the steering wheel includes a hub for connection to a steering column of a vehicle, a rim extending around the hub and a plurality of spokes connecting the hub and the rim. The rim can include the inner and outer regions of the steering wheel. In addition, the conductive lead for the at least one of the sensor loops can be routed from the rim through an area where one of the spokes connects with the rim. Optionally, the conductive lead for the at least one of the sensor loops can be routed without extending into a portion of any of the sensing zones defined by any adjacent sensor loops. Optionally, the conductive lead for the at least one of the sensor loops can be routed through a portion of the sensing zone defined by an adjacent sensor loop. Optionally, at least a section of the conductive lead that is routed through the portion of the sensing zone can include a shielding layer.

Optionally, the hand detection system can further include at least one heater mat and at least one overmolded layer, where each of the at least one heater mat and at least one overmolded layer are arranged in the steering wheel. The overmolded layer can optionally be arranged between the at least one heater mat and the sensor mat. Optionally, the at least one overmolded layer is formed from a polyurethane foam. Optionally, the at least one overmolded layer is formed from a thermoplastic elastomeric foam.

The steering wheel can further include an armature defining a rim of the steering wheel and a skin arranged around at least a portion of the armature. Optionally, the skin is arranged over at least one of the sensor mat and the at least one heater mat.

Alternatively or additionally, the hand detection system can optionally include at least two overmolded layers. A first overmolded layer can optionally be arranged between the sensor mat and the armature, and a second overmolded layer can optionally be arranged between the sensor mat and the at least one heater mat. Alternatively or additionally, a first overmolded layer can optionally be arranged between the at least one heater mat and the armature, and a second overmolded layer can optionally be arranged between the at least one heater mat and the sensor mat. Optionally, at least one of the overmolded layers is formed from a polyurethane foam. Optionally, at least one of the overmolded layers is formed from a thermoplastic elastomeric foam.

Alternatively or additionally, the sensor mat can have opposing edges defining alternating protruding and cut-away portions. For example, the alternating protruding and cut-away portions of the opposing edges can create an interleaved area when the sensor mat is arranged in the steering wheel. The opposing edges can optionally define at least one of a saw-tooth pattern and a castellated pattern.

A hand detection system according to another implementation can include a steering wheel, a sensor mat, a heater mat and an overmolded layer. The sensor mat, heater mat and overmolded layer can be arranged in the steering wheel. The overmolded layer can be arranged between the heater mat and the sensor mat. The hand detection system can also include a control unit configured to detect a driver's hand pressing a portion of the steering wheel corresponding to the sensing zone.

Additionally, the steering wheel can further include an armature defining a rim of the steering wheel and a skin arranged around at least a portion of the armature. The skin can be arranged over at least one of the sensor mat and the heater mat. Alternatively or additionally, the hand detection system can further include at least two overmolded layers. A first overmolded layer can optionally be arranged between the sensor mat and the armature, and a second overmolded layer can optionally be arranged between the sensor mat and the heater mat. Alternatively or additionally, a first overmolded layer can optionally be arranged between the heater mat and the armature, and a second overmolded layer can optionally be arranged between the heater mat and the sensor mat. Optionally, at least one of the overmolded layers is formed from a polyurethane foam. Optionally, at least one of the overmolded layers is formed from a thermoplastic elastomeric foam.

A hand detection system according to another implementation can include a steering wheel and a sensor mat arranged in the steering wheel. The sensor mat can define a sensing zone. The sensor mat can have opposing edges defining alternating protruding and cut-away portions. The alternating protruding and cut-away portions of the opposing edges can create an interleaved area when the sensor mat is arranged in the steering wheel. For example, the opposing edges can define at least one of a saw-tooth pattern and a castellated pattern. The hand detection system can also include a control unit configured to detect a driver's hand pressing a portion of the steering wheel corresponding to the sensing zone.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1 is an isometric view illustrating a vehicle interior with a steering wheel;

FIGS. 3A-3B are front, side and bottom views illustrating example 2-zone hand detection systems;

FIG. 3C is a pattern view illustrating the hand detection system shown in FIG. 3A;

FIGS. 4A-4B are front, side and bottom views illustrating example 3-zone hand detection systems;

FIG. 4C is a pattern view illustrating the hand detection system shown in FIG. 4A;

FIGS. 5A-5B are front, side and bottom views illustrating example 4-zone hand detection systems;

FIG. 5C is a pattern view illustrating the hand detection system shown in FIG. 5A;

FIGS. 6A-6B are front, side and bottom views illustrating example 6-zone hand detection systems;

FIG. 6C is a pattern view illustrating the hand detection system shown in FIG. 6A;

DETAILED DESCRIPTION

Figure 2A:
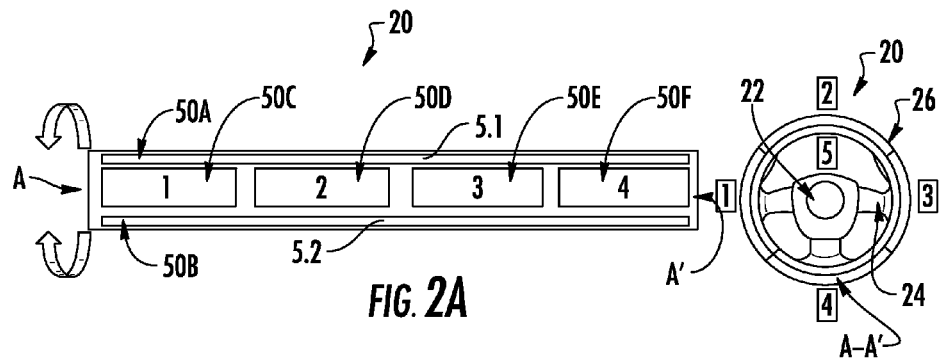
FIGS. 2A-2C are front and pattern views illustrating example hand detection systems.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for steering wheel hand detection systems, it will become evident to those skilled in the art that the implementations are not limited thereto.

As discussed above, hand detection systems are disclosed herein. The systems can optionally be used with a system for identifying the presence and/or location of a driver's hands on a steering wheel. The systems include a sensor mat having a plurality of sensor loops arranged in the steering wheel to achieve multiple sensing zones. Because the systems include a sensor mat having a plurality of sensor loops, the systems can be implemented in steering wheels having different designs. The systems can also be implemented to achieve different numbers and/or types (e.g., tap detection, swipe detection, grip detection, etc.) of sensing zones. Additionally, the systems can be implemented in a way that reduces the likelihood of crosstalk due to wire routing.

By placing a pressure sensitive material underneath a steering wheel underlay, such as the leather/foam of a steering wheel, or incorporating a pressure sensitive material into the steering wheel underlay, it is possible to detect the number of hands on the steering wheel and where they are placed.

The steering wheel can be separated into a number of zones. For example, the steering wheel can have a four-spoke design, as shown in the example of FIG. 1 below, that includes four zones—an upper rim portion, a lower rim portion, a left hand portion and a right hand portion. When pressure is detected on the steering wheel rim in one or more of the zones, such as due to a drive grasping the steering wheel with one or both of the driver's hands, a touch point can be identified. Using vehicle settings, a minimum number of touch points could be pre-set to establish a safe driving condition.

The features described herein can be part of a hand detection system, which can include a steering wheel, one or more pressure sensitive sensors, and a control unit. The control unit can be configured or programmed to perform the steps and features described herein, such as receiving signals from the pressure sensitive sensors, outputting information to be recorded or sent via messages, and/or providing commands to devices, such as heating devices. The control unit can be, for example, an CPU with non-volatile memory including programming for the steps and features described herein.

For example, seasoned, experienced drivers could set a control system or unit, to demand only one point of contact, whereas parents of younger, inexperienced drivers, who may be more prone to temptations with electronic devices, could set the system to demand two contact points, such as contact points on the left hand side and the right hand side of the steering wheel corresponding to contact points for each hand.

In another example, a system for determining the presence and positioning of hands on the steering wheel may be employed with a heated steering wheel system. The hand contact points can be used to locally heat the steering wheel where only the hands are, allowing for a faster heat up than when heating the entire steering wheel rim. Such a system also provides a more efficient heating system by only heating those areas of a steering wheel being grasped by a driver's hands.

Separate heating loops within the heating element design can be provided for each sensing zone of a steering wheel, such as four zones of a steering wheel, as described above. All of the separate loops can pass within a heating thermostat temperature reading zone such that the temperature could be controlled by the electronic or bi-metallic heating controller. An electronic control unit or circuit can determine, based on input of whether the heated wheel was turned on and based on where the hands of a driver are located, how to prioritize electrical current to the various zones or heating loops, such as by giving higher priority to the zones which are contacted by the driver's hands. By prioritizing the heated areas or only heated those areas or zones being contacted, the amount of heatable area can be reduced and a faster heat up curve or response can be achieved by channeling the same total current into a smaller heater circuit, thus improving the heat up rate of the steering wheel in those zones where the hands of a driver are located.

FIG. 1 shows an example of an interior 10 of a vehicle cockpit, which includes a steering wheel 20. The driver may rotate the steering wheel 20 to turn the vehicle wheels and steer the vehicle in a desired direction, as is normally done when driving a vehicle. The steering wheel 20 may also include various controls, such as switches or buttons, provided within easy reach of the driver. Such controls may be for a vehicle audio system (such as for controlling volume, tuning, mode, etc.), for vehicle lighting (such as overhead lighting, headlights, etc.), for a phone, or for other controls, such as cruise control. Controls for systems such as an audio system, climate system, lighting system or other systems may also be provided elsewhere in the vehicle, such as on the vehicle dash or center console. A control unit or processing system 52, which is discussed in further detail below, can also be provided in the vehicle.

The steering wheel 20 can also include a central hub 22 connected to an outer ring or rim 26 with one or more spokes 24. The hub 22 can be coupled to the steering column of a vehicle. A driver can turn the steering wheel 20 by grasping the outer rim 26. The steering wheel 20 may be a four-spoke steering wheel, as shown in the example of FIG. 1. In another example, the steering wheel 20 may be a three-spoke steering wheel, as shown in the examples of FIGS. 2A-6C. In other examples, the steering wheel 20 may have a different number or arrangement of spokes.

Figure 2B:
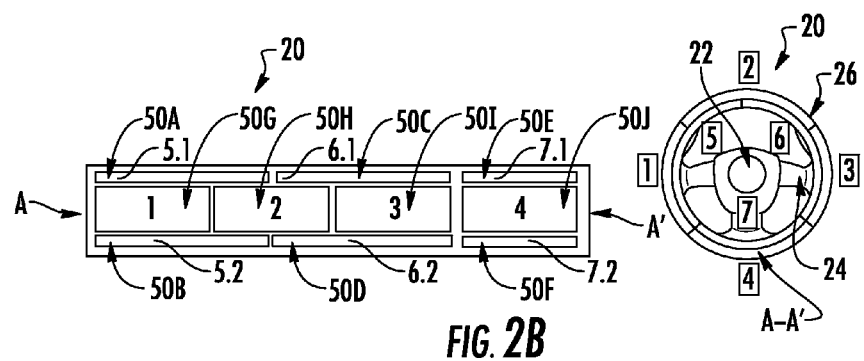
Figure 2C:
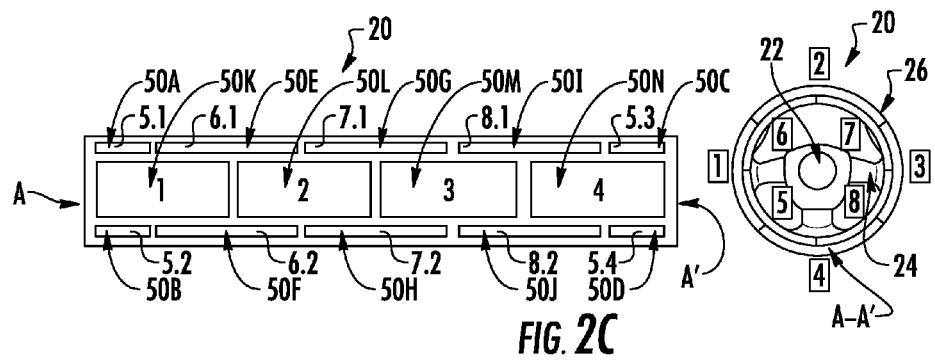
Figure 8:
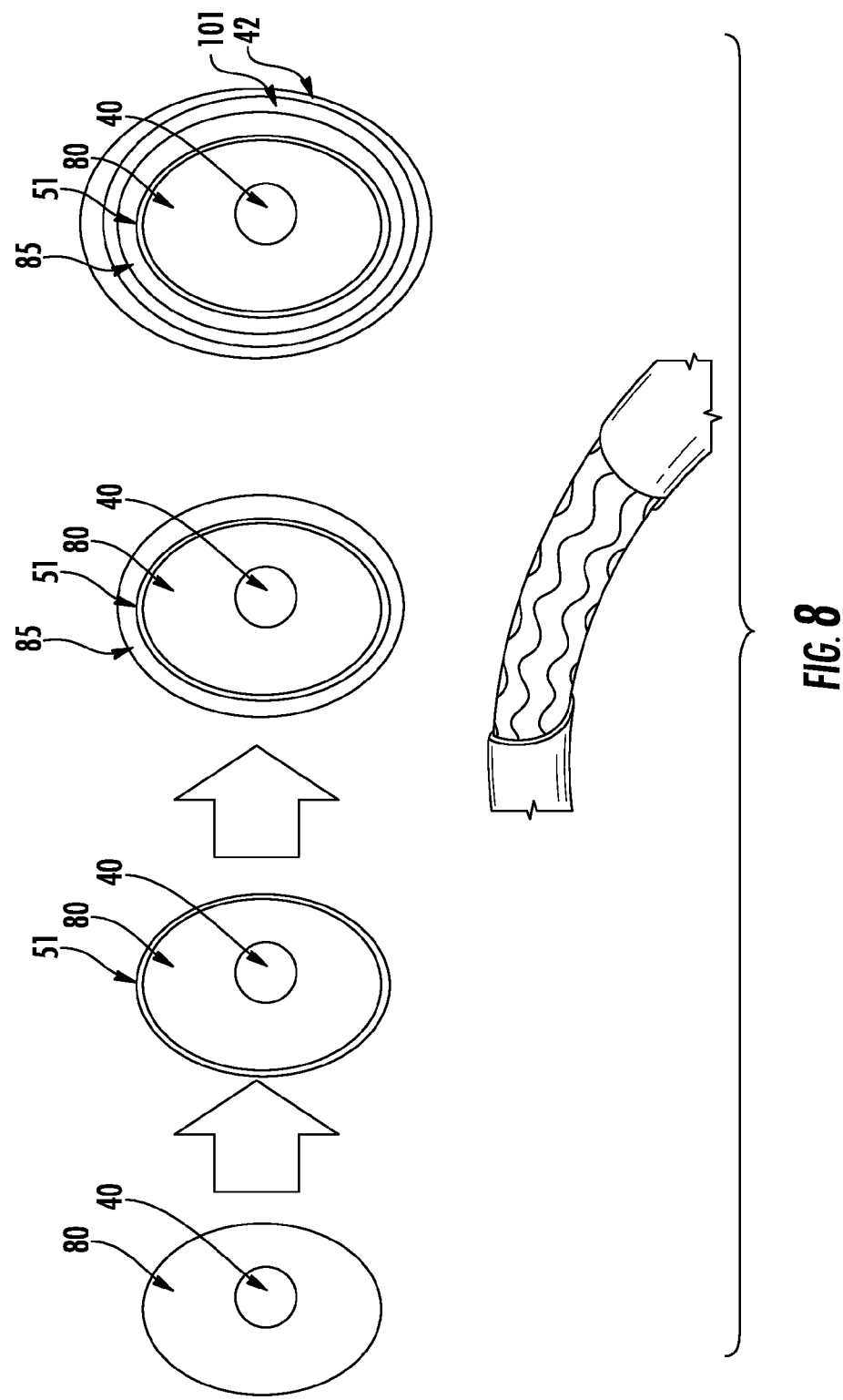
FIG. 8 are sectional views and a perspective view of a steering wheel.

Referring now to FIGS. 2A-2C, front and pattern views of example hand detection systems are shown. Similar to above, the steering wheels 20 include a central hub 22 connected to a rim 26 with one or more spokes 24. As shown in FIG. 2A, a hand detection system can include the steering wheel 20 having an inner region and an outer region. As discussed in detail below, the steering wheel 20 can include an armature at least partially surrounded by one or more layers including, but not limited to, overmolded layers, sensor mats, heater mats, skin, etc. A cross section of the steering wheel 20 can define a substantially round shape as shown in the example of FIG. 8. The inner region of the steering wheel 20 can optionally be a section of the rim 26 that substantially faces toward the central hub 22. For example, the inner region of the steering wheel 20 can optionally include the section of the rim 26 in contact with the driver's thumb(s) when grasping the steering wheel 20. The outer region of the steering wheel 20 can optionally be a section of the rim 26 that substantially faces away from the central hub 22. For example, the outer region of the steering wheel 20 can optionally include the section of the rim 26 in contact with the driver's fingers when grasping the steering wheel 20. This disclosure contemplates that the inner and outer regions are not limited to a section of the rim 26 substantially facing toward the central hub 22 and a section of the rim 26 substantially facing away from the central hub 22, respectively. For example, the inner region can optionally be a section of the rim 26 substantially facing away from the driver (i.e., a back surface of the steering wheel with respect to the driver), and the outer region can optionally be a section of the rim 26 substantially facing toward the driver (i.e., a front surface of the steering wheel with respect to the driver). Additionally, the inner and outer regions of the steering wheel 20 can optionally occupy other sections of the rim 26, including sections of the rim 26 separated by less than approximately 180 degrees.

A sensor mat having a plurality of sensor loops 50A-50F are arranged in the steering wheel 20. The inner region can include one or more sensor loops. In FIG. 2A, the inner region includes sensor loops 50A-50B, for example. The inner region can optionally be in proximity to an "inside" circumference of the rim 26, e.g., a section of the rim 26 substantially facing toward the central hub 22. Additionally, the inner region can optionally be in proximity to a portion of the steering wheel 20 facing away from the driver. The outer region can include one or more sensor loops. In FIG. 2A, the outer region includes sensor loops 50C-50F, for example. The outer region can optionally be in proximity to an "outer" circumference of the rim 26, e.g., a section of the rim 26 substantially facing away from the central hub 22. Additionally, the outer region can optionally be in proximity to a portion of the steering wheel 20 facing toward the driver. Optionally, the inner region and the outer region can be arranged circumferentially around the rim 26. For example, the inner region and the outer region can be separated by approximately 180 degrees. It should be understood that the inner region and the outer region can be separated by more or less than 180 degrees such as 90 degrees, 120 degrees, 270 degrees, etc.

Each of the sensor loops 50A-50F can define a sensing zone. For example, sensor loop 50A can define sensing zone 5.1. Sensor loop 50B can define sensing zone 5.2. Sensor loop 50C can define sensing zone 1. Sensor loop 50D can define sensing zone 2. Sensor loop 50E can define sensing zone 3. Sensor loop 50F can define sensing zone 4. As shown in FIG. 2A, the meeting point on the steering wheel 20 between sensing zone 1 and sensing zone 4 is labeled as reference character A-A' in the front and pattern views. Additionally, as shown in the pattern view of FIG. 2A, the inner region is configured in a split zone configuration where sensing zone 5 is split between zones 5.1 and 5.2. Optionally, the inner region can include one or more sensor loops without being configured in a split zone configuration. Optionally, the outer region can include one or more sensor loops configured in a split zone configuration.

Referring now to FIG. 2B, the inner region includes sensor loops 50A-50F, and the outer region includes sensor loops 50G-50J, for example. Each of the sensor loops 50A-50J can define a sensing zone. Sensor loop 50A can define sensing zone 5.1. Sensor loop 50B can define sensing zone 5.2. Sensor loop 50C can define sensing zone 6.1. Sensor loop 50D can define sensing zone 6.2. Sensor loop 50E can define sensing zone 7.1. Sensor loop 50F can define sensing zone 7.2. Sensor loop 50G can define sensing zone 1. Sensor loop 50H can define sensing zone 2. Sensor loop 50I can define sensing zone 3. Sensor loop 50J can define sensing zone 4. As shown in FIG. 2B, the meeting point on the steering wheel 20 between sensing zone 1 and sensing zone 4 is labeled as reference character A-A' in the front and pattern views. Additionally, as shown in the pattern view of FIG. 2B, the inner region is configured in a split zone configuration where sensing zones 5, 6 and 7 are split between zones 5.1, 5.2, 6.1, 6.2, 7.1 and 7.2, respectively. Optionally, the inner region can include one or more sensor loops without being configured in a split zone configuration. Optionally, the outer region can include one or more sensor loops configured in a split zone configuration.

Referring now to FIG. 2C, the inner region includes sensor loops 50A-50J, and the outer region includes sensor loops 50K-50N, for example. Each of the sensor loops 50A-50N can define a sensing zone. Sensor loop 50A can define sensing zone 5.1. Sensor loop 50B can define sensing zone 5.2. Sensor loop 50C can define sensing zone 5.3. Sensor loop 50D can define sensing zone 5.4. Sensor loop 50E can define sensing zone 6.1. Sensor loop 50F can define sensing zone 6.2. Sensor loop 50G can define sensing zone 7.1. Sensor loop 50H can define sensing zone 7.2. Sensor loop 50I can define sensing zone 8.1. Sensor loop 50J can define sensing zone 8.2. Sensor loop 50K can define sensing zone 1. Sensor loop 50L can define sensing zone 2. Sensor loop 50M can define sensing zone 3. Sensor loop 50N can define sensing zone 4. As shown in FIG. 2C, the meeting point on the steering wheel 20 between sensing zone 1 and sensing zone 4 is labeled as reference character A-A' in the front and pattern views. Additionally, as shown in the pattern view of FIG. 2C, the inner region is configured in a split zone configuration where sensing zones 5, 6, 7 and 8 are split between zones 5.1, 5.2, 5.3, 5.4, 6.1, 6.2, 7.1, 7.2, 8.1 and 8.2, respectively. Optionally, the inner region can include one or more sensor loops without being configured in a split zone configuration. Optionally, the outer region can include one or more sensor loops configured in a split zone configuration.

The hand detection system shown in FIGS. 2A-2C can also include a control unit, such as control unit 52 as shown in the example of FIG. 1, configured to detect when a driver's hand (or other part of the driver's body such as an elbow, knee, head, forearm, etc.) is pressing a portion of the steering wheel 20 corresponding to one or more of the sensing zones. For example, each of the sensor loops can define a touch sensing zone, and the control unit 52 can be configured to detect when the driver's hand is touching a sensing zone. The control unit 52 can optionally be configured to detect when the driver's hand taps or holds (e.g., a prolonged touch compared to a tap) a touch sensing zone. For example, in FIG. 2A, each of the sensor loops 50A-50F can define a touch sensing zone. Alternatively or additionally, one or more of the sensor loops can define a swipe sensing zone, and the control unit 52 can be configured to detect when the driver's hand makes a swipe gesture (e.g., continuous contact with a sensing zone between two or more points) in a swipe sensing zone. For example, in FIG. 2A, each of the sensor loops 50C-50F can define a swipe sensing zone. Alternatively or additionally, an overlapping portion between a sensor loop arranged in the inner region and a sensor loop arranged in the outer region can define a grip sensing zone, and the control unit 52 can be configured to detect when the driver's hand grips (e.g., at least partially wraps around and makes contact with the overlapping sensor loops) a grip sensing zone. For example, in FIG. 2A, sensor loops 50A and/or 50B arranged in the inner region at least partially overlaps with sensor loop 50C in the outer region, which defines a grip sensing region. The outputs from the one or more touch sensing zones, one or more swipe sensing zones and/or one or more grip sensing zones can optionally be used by the vehicle safety systems (e.g., hands on/off detection), vehicle control systems (e.g., audio, lighting, environmental, vehicle control, etc.) and/or steering wheel heating systems.

Referring now to FIGS. 3A-3B, front, side and bottom views illustrating example 2-zone hand detection systems are shown. The 2-zone hand detection systems include the steering wheels 20 having a central hub 22 connected to a rim 26 with one or more spokes 24. In FIG. 3A, the steering wheel 20 includes a sensor mat having a plurality of sensor loops including sensor loop 50A arranged in the inner region and sensor loop 50B arranged in the outer region. In FIG. 3B, the steering wheel 20 includes a sensor mat having a plurality of sensor loops including sensor loop 50A arranged in the front region (i.e., facing toward the driver) and sensor loop 50B arranged in the back region (i.e., facing away from the driver). Each of sensor loops 50A, 50B defines a sensing region such as a touch sensing region, for example. Alternatively or additionally, the overlapping portion of sensor loops 50A, 50B define a grip sensing region. Optionally, as discussed above, the inner region and/or the outer region can be configured in a split zone configuration where a sensing zone includes multiple sensor loops (e.g., 2, 4, etc. sensor loops).

Referring now to FIG. 3C, a pattern view of the 2-zone hand detection system of FIG. 3A is shown. The steering wheel 20 includes a sensor mat having a plurality of sensor loops including sensor loops 50A, 50A' (i.e., split zone configuration) arranged in the inner region and sensor loop 50B arranged in the outer region. The meeting point on the steering wheel 20 is labeled as reference character A-A' in FIGS. 3A and 3C. As shown in FIG. 3C, each of the sensor loops 50A, 50A', 50B can further include a conductive lead 52, 54, 56 for communicating an electrical signal to a control unit (e.g., control unit 52, for example). The conductive lead for at least one of the sensor loops 50A, 50A', 50B can optionally be routed without extending into a portion of any of the sensing zones defined by any adjacent sensor loops. This minimizes the amount of crosstalk between sensor loops. For example, conductive lead 52 (i.e., the conductive lead of sensor loop 50A) is routed without extending into any portion of the sensing zones defined by sensor loops 50A', 50B. Optionally, conductive lead 52 is routed from the rim 26 through an area 24A where one of the spokes 24 connects with the rim 26. Optionally, the conductive leads 52, 54, 56 for each of the sensor loops 50A, 50A', 50B can optionally be routed without extending into a portion of any of the sensing zones defined by any adjacent sensor loops.

Referring now to FIGS. 4A-4B, front, side and bottom views illustrating example 3-zone hand detection systems are shown. The 3-zone hand detection systems include the steering wheels 20 having a central hub 22 connected to a rim 26 with one or more spokes 24. In FIG. 4A, the steering wheel 20 includes a sensor mat having a plurality of sensor loops including sensor loop 50A arranged in the inner region and sensor loops 50B, 50C arranged in the outer region. Sensor loops 50B, 50C arranged in the outer region are arranged in a spaced apart pattern. In FIG. 4B, the steering wheel 20 includes a sensor mat having a plurality of sensor loops including sensor loop 50A arranged in the back region and sensor loops 50B, 50C arranged in the front region. Sensor loops 50B, 50C arranged in the front region are arranged in a spaced apart pattern. Each of sensor loops 50A, 50B, 50C defines a sensing region such as a touch sensing region, for example. Alternatively or additionally, one or more of the sensor loops 50A, 50B, 50C defines a swipe sensing region. For example, each of sensor loops 50B, 50C arranged in the outer region can define a swipe sensing region. Alternatively or additionally, overlapping portions of a sensor loop arranged in the inner region and a sensor loop arranged in the outer region can define a grip sensing region. For example, the overlapping portions of sensor loops 50A, 50B define a grip sensing region. Optionally, as discussed above, the inner region and/or the outer region can be configured in a split zone configuration where a sensing zone includes multiple sensor loops (e.g., 2, 4, etc. sensor loops).

Referring now to FIG. 4C, a pattern view of the 3-zone hand detection system of FIG. 4A is shown. The steering wheel 20 includes a sensor mat having a plurality of sensor loops including sensor loops 50A, 50A' (i.e., split zone configuration) arranged in the inner region and sensor loops 50B, 50C arranged in the outer region. The meeting point between sensor loops 50B, 50C on the steering wheel 20 is labeled as reference character A-A' in FIGS. 4A and 4C. As shown in FIG. 4C, each of the sensor loops 50A, 50A', 50B, 50C can further include a conductive lead 52, 54, 56, 58 for communicating an electrical signal to a control unit (e.g., control unit 52, for example). The conductive lead for at least one of the sensor loops 50A, 50A', 50B, 50C can optionally be routed without extending into a portion of any of the sensing zones defined by any adjacent sensor loops. This minimizes the amount of crosstalk between sensor loops. For example, conductive lead 52 (i.e., the conductive lead of sensor loop 50A) is routed without extending into any portion of the sensing zones defined by sensor loops 50A', 50B, 50C. Optionally, conductive lead 52 is routed from the rim 26 through an area 24A where one of the spokes 24 connects with the rim 26. Optionally, the conductive leads 52, 54, 56, 58 for each of the sensor loops 50A, 50A', 50B, 50C can optionally be routed without extending into a portion of any of the sensing zones defined by any adjacent sensor loops.

Referring now to FIGS. 5A-5B, front, side and bottom views illustrating example 4-zone hand detection systems are shown. The 4-zone hand detection systems include the steering wheels 20 having a central hub 22 connected to a rim 26 with one or more spokes 24. In FIG. 5A, the steering wheel 20 includes a sensor mat having a plurality of sensor loops including sensor loops 50A, 50B arranged in the inner region and sensor loops 50C, 50D arranged in the outer region. Sensor loops 50A, 50B arranged in the inner region and sensor loops 50C, 50D arranged in the outer region are arranged in a spaced apart pattern. Optionally, a center point of the at least one of the sensor loops arranged in the outer region (e.g., sensor loop 50C) can optionally be positioned less than or equal to approximately 90 degrees with respect to a center point of each of the at least two of the sensor loops arranged in the inner region (e.g., sensor loops 50A, 50B). In FIG. 5B, the steering wheel 20 includes a sensor mat having a plurality of sensor loops including sensor loops 50A, 50B arranged in the back region and sensor loops 50C, 50D arranged in the front region. Sensor loops 50A, 50B arranged in the back region and sensor loops 50C, 50D arranged in the front region are arranged in a spaced apart pattern. Optionally, a center point of the at least one of the sensor loops arranged in the front region (e.g., sensor loop 50C) can optionally be positioned less than or equal to approximately 90 degrees with respect to a center point of each of the at least two of the sensor loops arranged in the back region (e.g., sensor loops 50A, 50B). Each of sensor loops 50A, 50B, 50C, 50D defines a sensing region such as a touch sensing region, for example. Alternatively or additionally, one or more of the sensor loops 50A, 50B, 50C, 50D defines a swipe sensing region. For example, each of sensor loops 50C, 50D arranged in the outer region can define a swipe sensing region. Alternatively or additionally, overlapping portions of a sensor loop arranged in the inner region and a sensor loop arranged in the outer region can define a grip sensing region. For example, the overlapping portions of sensor loops 50A, 50C and sensor loops 50B, 50C define grip sensing regions, respectively. Optionally, as discussed above, the inner region and/or the outer region can be configured in a split zone configuration where a sensing zone includes multiple sensor loops (e.g., 2, 4, etc. sensor loops).

Referring now to FIG. 5C, a pattern view of the 4-zone hand detection system of FIG. 5A is shown. The steering wheel 20 includes a sensor mat having a plurality of sensor loops including sensor loops 50A, 50A', 50B, 50B', 50B'', 50B''' (i.e., split zone configuration) arranged in the inner region and sensor loops 50C, 50D arranged in the outer region. The meeting point between sensor loops 50C, 50D on the steering wheel 20 is labeled as reference character A-A' in FIGS. 5A and 5C. As shown in FIG. 5C, each of the sensor loops 50A, 50A', 50B, 50B', 50B'', 50B''', 50C, 50D can further include a conductive lead 52, 54, 56, 58, 60, 62, 64, 66 for communicating an electrical signal to a control unit (e.g., control unit 52, for example). The conductive lead for at least one of the sensor loops 50A, 50A', 50B, 50B', 50B'', 50B''', 50C, 50D can optionally be routed without extending into a portion of any of the sensing zones defined by any adjacent sensor loops. This minimizes the amount of crosstalk between sensor loops. For example, conductive lead 64 (i.e., the conductive lead of sensor loop 50C) is routed without extending into any portion of the sensing zones defined by sensor loops 50A, 50A', 50B, 50B', 50B'', 50B''', 50D. Conductive lead 64 is routed through a space between at least two sensor loops arranged in the inner region such as sensor loops 50A', 50B', for example. Optionally, conductive lead 64 is routed from the rim 26 through an area 24A where one of the spokes 24 connects with the rim 26. Optionally, the conductive leads 52, 54, 56, 58, 60, 62, 64, 66 for each of the sensor loops 50A, 50A', 50B, 50B', 50B'', 50B''', 50C, 50D can optionally be routed without extending into a portion of any of the sensing zones defined by any adjacent sensor loops.

Referring now to FIGS. 6A-6B, front, side and bottom views illustrating example 6-zone hand detection systems are shown. The 6-zone hand detection systems include the steering wheels 20 having a central hub 22 connected to a rim 26 with one or more spokes 24. In FIG. 6A, the steering wheel 20 includes a sensor mat having a plurality of sensor loops including sensor loops 50A, 50B, 50C arranged in the inner region and sensor loops 50D, 50E, 50F arranged in the outer region. Sensor loops 50A, 50B, 50C arranged in the inner region and sensor loops 50D, 50E, 50F arranged in the outer region are arranged in a spaced apart pattern. Optionally, a center point of the at least one of the sensor loops arranged in the outer region (e.g., sensor loop 50D) can optionally be positioned less than or equal to approximately 90 degrees with respect to a center point of each of the at least two of the sensor loops arranged in the inner region (e.g., sensor loops 50A, 50B). In FIG. 6B, the steering wheel 20 includes a sensor mat having a plurality of sensor loops including sensor loops 50A, 50B, 50C arranged in the back region and sensor loops 50D, 50E, 50F arranged in the front region. Sensor loops 50A, 50B, 50C arranged in the back region and sensor loops 50D, 50E, 50F arranged in the front region are arranged in a spaced apart pattern. Optionally, a center point of the at least one of the sensor loops arranged in the front region (e.g., sensor loop 50D) can optionally be positioned less than or equal to approximately 90 degrees with respect to a center point of each of the at least two of the sensor loops arranged in the back region (e.g., sensor loops 50A, 50B). Each of sensor loops 50A, 50B, 50C, 50D, 50E, 50F defines a sensing region such as a touch sensing region, for example. Alternatively or additionally, one or more of the sensor loops 50A, 50B, 50C, 50D, 50E, 50F defines a swipe sensing region. For example, each of sensor loops 50D, 50E, 50F arranged in the outer region can define a swipe sensing region. Alternatively or additionally, overlapping portions of a sensor loop arranged in the inner region and a sensor loop arranged in the outer region can define a grip sensing region. For example, the overlapping portions of sensor loops 50A, 50D and sensor loops 50B, 50D define grip sensing regions, respectively. Optionally, as discussed above, the inner region and/or the outer region can be configured in a split zone configuration where a sensing zone includes multiple sensor loops (e.g., 2, 4, etc. sensor loops).

Referring now to FIG. 6C, a pattern view of the 6-zone hand detection system of FIG. 6A is shown. The steering wheel 20 includes a sensor mat having a plurality of sensor loops including sensor loops 50A, 50A', 50B, 50B', 50C, 50C', 50C'', 50C''' (i.e., split zone configuration) arranged in the inner region and sensor loops 50D, 50E, 50F arranged in the outer region. The meeting point between sensor loops 50E, 50F on the steering wheel 20 is labeled as reference character A-A' in FIGS. 6A and 6C. As shown in FIG. 6C, each of the sensor loops 50A, 50A', 50B, 50B', 50C, 50C', 50C'', 50C''', 50D, 50E, 50F can further include a conductive lead 52, 54, 56, 58, 60, 62, 64, 66, 68, 70, 72 for communicating an electrical signal to a control unit (e.g., control unit 52, for example). The conductive lead for at least one of the sensor loops 50A, 50A', 50B, 50B', 50C, 50C', 50C'', 50C''', 50D, 50E, 50F can optionally be routed without extending into a portion of any of the sensing zones defined by any adjacent sensor loops. This minimizes the amount of crosstalk between sensor loops. For example, conductive lead 70 (i.e., the conductive lead of sensor loop 50E) is routed without extending into any portion of the sensing zones defined by sensor loops 50A, 50A', 50B, 50B', 50C, 50C', 50C'', 50C''', 50D, 50F. Conductive lead 70 is routed through a space between at least two sensor loops arranged in the inner region such as sensor loops 50C, 50C'', for example. Optionally, conductive lead 70 is routed from the rim 26 through an area 24A where one of the spokes 24 connects with the rim 26. Optionally, the conductive leads 52, 54, 56, 58, 60, 62, 64, 66, 68, 70, 72 for each of the sensor loops 50A, 50A', 50B, 50B', 50C, 50C', 50C'', 50C''', 50D, 50E, 50F can optionally be routed without extending into a portion of any of the sensing zones defined by any adjacent sensor loops. Optionally, the conductive lead for at least one of the sensor loops 50A, 50A', 50B, 50B, 50B', 50C, 50C', 50C', 50C''', 50D, 50E, 50F can be routed through a portion of the sensing zones defined by an adjacent sensor loop. For example, conductive lead 68 (i.e., the conductive lead for sensor loop 50D) is routed through a portion of the sensing zone defined by sensor loop 50A. Optionally, at least a section of conductive lead 68 that is routed through the sensing zone defined by sensor loop 50A is shielded (e.g., by providing a shielding layer over the conductive lead). This minimizes the amount of crosstalk between sensor loops when a conductive lead is routed through a sensing zone defined by an adjacent sensor loop. Optionally, conductive lead 68 is routed from the rim 26 through an area 24B where one of the spokes 24 connects with the rim 26.

The hand detection systems shown in the examples of FIGS. 2A-6C are provided only as examples. This disclosure contemplates that hand detection systems other than those shown can be provided in accordance with the teachings of this disclosure. For example, 5-zone, 7-zone, 8-zone, 9-zone, 10-zone, etc. hand detection system can be designed using a plurality of sensor loops.

As discussed above, the steering wheels 20 discussed with regard to FIGS. 2A-6C include a sensor mat having a plurality of sensor loops 50. Such a sensor mat can be, for example a pressure-sensitive material which is provided between the armature 40 (or the main body) and the outer skin 42, as discussed with regard to FIG. 8. Such a pressure sensor mat can be configured to sense the pressure caused by a hand gripping a region of the steering wheel 20 proximate to each of the sensor loops 50. For example, a steering wheel 20 can include four sensor loops 50 arranged on the outer rim 26 about the periphery of the steering wheel 20. In other embodiments, the steering wheel 20 may include a greater or fewer number of zones and a greater or fewer number of sensor loops 50. Increasing the number of sensor loops 50 can increase the accuracy with which the location of the driver's hands on the steering wheel 20 may be sensed. While the sensor loops 50 are shown in the figures as being located on the outer rim 26 of the steering wheel 20, in other embodiments, to even more accurately sense the locations of the driver's hands, such sensors may be provided under the skin 42 in other locations, such as on the spokes 24 or on the hub 22.

Such pressure sensors are described in U.S. application Ser. No. 13/076,226, filed on Mar. 30, 2011, which is incorporated by reference herein in its entirety. As discussed in U.S. application Ser. No. 13/076,226, such pressure sensors may include sheets of carrier material, conductors, electrodes, and a pressure sensitive material configured in a generally symmetric, layered relationship (e.g., a carrier sheet, conductor, and electrode disposed on each side of the pressure sensitive material). The carrier sheets, conductors, electrodes, and pressure sensitive material may be selectively configured to change conductive or electrical characteristics of the sensors according to the forces expected during a dynamic impact event.

As discussed in U.S. application Ser. No. 13/076,226, such pressure sensitive material can be configured to change resistance or conductive/electrical characteristics in response to force or pressure acting thereupon. More particularly, the pressure sensitive material can behave substantially as an isolator when no force or pressure is present and decreases in resistance as more force or pressure is present. Between low and high forces, the pressure sensitive material responds to force or pressure in a predictable manner, decreasing in resistance with increasing force. The pressure sensitive material may, for example, be a carbon nanotube conductive polymer. The pressure sensitive material can be applied to one of the electrodes by a printing process, such as two- or three-dimensional ink jet or screen printing, vapor deposition, or conventional printed circuit techniques, such etching, photo-engraving, or milling. As pressure sensitive materials with smaller particle sizes are used, such as that of grapheme or a grapheme conductive polymer, the pressure sensitive material may also be applied through conventional printed circuit techniques, such as vapor deposition. According to other exemplary embodiments, the pressure sensitive material may be a silicene polymer material doped with a conductor, such as silver or copper. According to other examples, the pressure sensitive material can be a quantum tunneling composite (QTC), which is a variable resistance pressure sensitive material that employs Fowler-Nordheim tunneling. QTC is a material commercially made by Peratech (www.peratech.com), of Brompton-on-Swale, UK. The QTC material in the sensors may act as an insulator when zero pressure or zero force is applied, since the conductive particles may be too far apart to conduct, but as pressure (or force) is applied, the conductive particles move closer to other conductive particles, so that electrons can pass through the insulator layer changing the insulator layer changing the resistance of the sensor. Thus, the resistance of the QTC in the sensors is a function of the force or pressure acting upon the sensor.

A pressure sensitive material can be desirable as a sensor mat to determine the location of hands on a steering wheel 20 because it can be concealed under the skin 42, and therefore not interfere with the aesthetic or ergonomic function of the skin 42. Further, a pressure sensor mat is able to sense the presence of a hand on the steering wheel 20 even if the driver's hands are covered with clothing such as gloves, which could interfere with another type of sensor such as a capacitance sensor.

The skin 42 may be a relatively tight film or material that imparts an inward force on the outer rim 26. This initial force caused by the tension of the skin 42 may be compensated for and the system may be calibrated or zeroed to ignore this force and only sense the pressure caused by the hands of the driver.

Determining the presence and location of the driver's hands on the steering wheel can be used to monitor driving habits and provide feedback or warnings to the driver. The sensor mat may be coupled to a control unit or processing system 52, as shown in the example of FIG. 1, which can receive data from the sensor loops 50 and activate other visual, audio, or other functional signals or feedback mechanisms.

Figure 7:
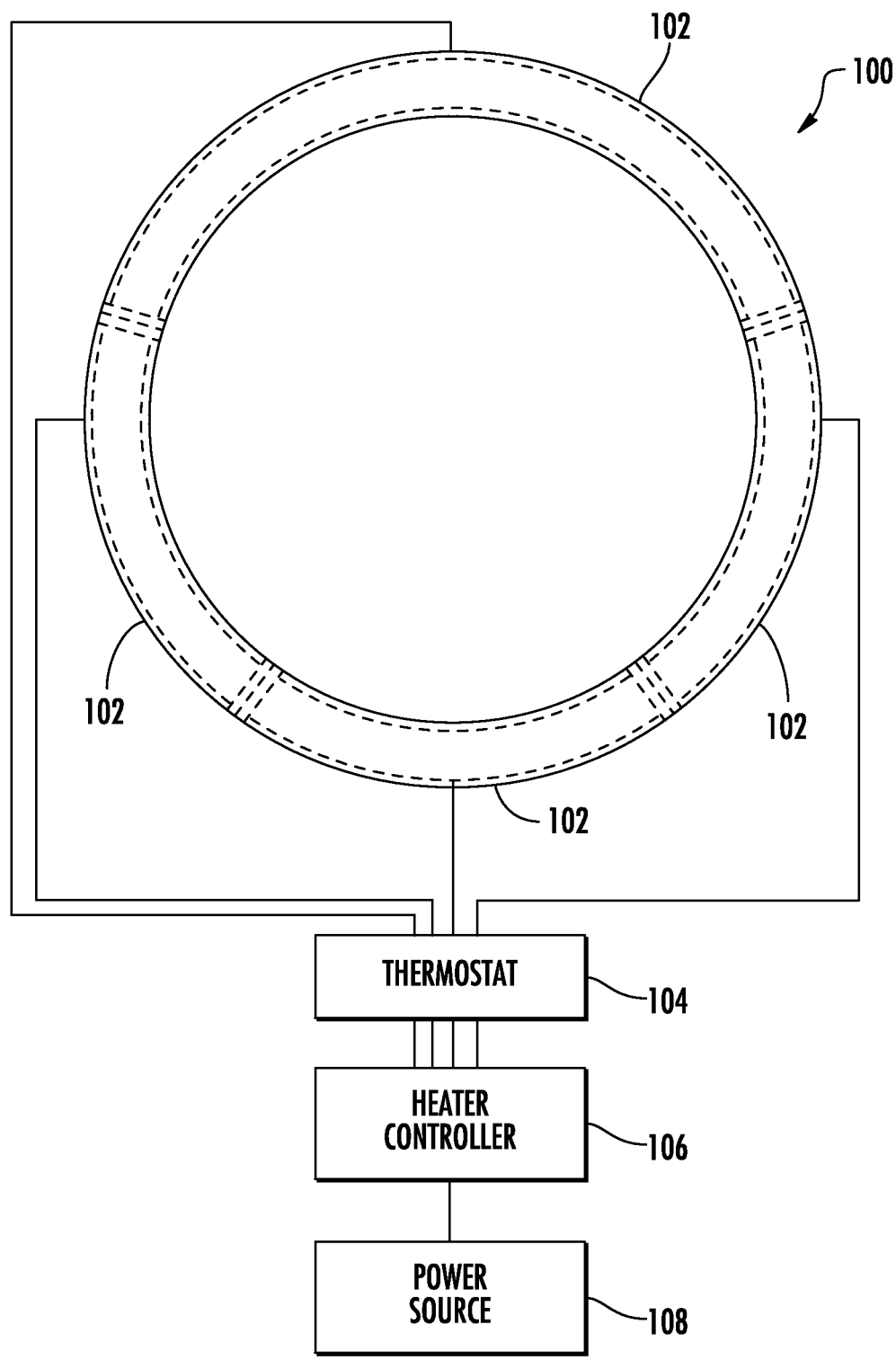
FIG. 7 is a block diagram illustrating a heating system for a steering wheel.

As shown in the example of FIG. 7, a heating system 100 can include a heater mat including multiple heating loops or zones 102 on the rim 26. Each loop 102 corresponds to one of the sensing zones (such as sensing zones shown in the examples of FIGS. 2A-6C) of the steering wheel 20. The number and arrangement of the heating loops 102 may vary depending on the number and arrangement of the sensing zones. Each of the separate loops 102 can be coupled to a thermostat 104. The temperatures of the individual loops 102 can be controlled by a heating controller 106 (such as an electronic or bi-metallic controller) drawing power from a power source 108, such as the electrical system of a vehicle. The controller 106 can use an electronic circuit or control unit to determine the heat to apply to the loops 102 based on the status of the heating system 100 (e.g., if it is turned on or off) and the positions of the driver's hands on the outer rim 26 as determined by the sensor loops 50.

By determining the position of the driver's hands, the heating system 100 can be heat up only the portions of the rim 26 where the driver's hands are located or heat those portions nearby. By reducing the amount of heatable area, a faster heat up curve or response can be achieved by channeling the same total current into a smaller heater circuit, thus improving the heat up rate of the steering wheel in the zones where the hands are located.

Referring to FIG. 8, the steering wheels 20 discussed herein can include an armature 40 formed from a relatively rigid material such as a metal (such as, for example, steel, magnesium, or aluminum, etc.), a polymer, wood, or a composite material such as a reinforced polymer (such as, for example, a fiber-reinforced polymer, a particle reinforced polymer, etc.). Such an armature 40 can be provided in the form of a frame, shell, base, or other armature form used in the art. The armature 40 can provide strength and shape to the steering wheel 20. If the armature 40 is a hollow body, it may be filled with a sound-dampening material such as a polyurethane foam or other suitable material. In addition, the armature 40 may be surrounded by a first overmolded layer 80, which provides a main body of the outer rim 26, such as a polymer, foam, wood, etc. For example, the first overmolded layer 80 can optionally be a polyurethane foam layer. Optionally, the first overmolded layer 80 can be a thermoplastic elastomeric foam. In addition, a sensor mat 51 can optionally be provided over at least a portion of the first overmolded layer 80. The sensor mat 51 can optionally be the sensor mat including a plurality of sensor loops (e.g., sensor loops 50), each sensor loop defining a sensing zone, which are discussed above in the examples of FIGS. 2A-6C. The sensor mat 51 can optionally be a sensor mat defining a single sensing zone. Additionally, a second overmolded layer 85 can optionally surround at least a portion of the sensor mat 51. For example, the second overmolded layer 85 can optionally be a polyurethane foam layer. Optionally, the second overmolded layer 85 can be a thermoplastic elastomeric foam. Further, a heating mat 101 can optionally be provided over at least a portion of the second overmolded layer 85. The heating mat 101 can optionally be the heating mat including multiple heating zones 102 discussed above in the example of FIG. 7. The heating mat 101 can optionally be a heating mat defining a single heating zone. The second overmolded layer 85 can provide a layer of shielding between the sensor mat 51 and the heating mat 101. Thus, additional shielding layer(s) may not be required between the sensor and heating mats, which reduces the cost of producing the steering wheel 20. Optionally, the heating mat 101 can be provided over at least a portion of the first overmolded layer 80 and the sensor mat 51 can be provided over at least a portion of the second overmolded layer 85.

Figure 9A:
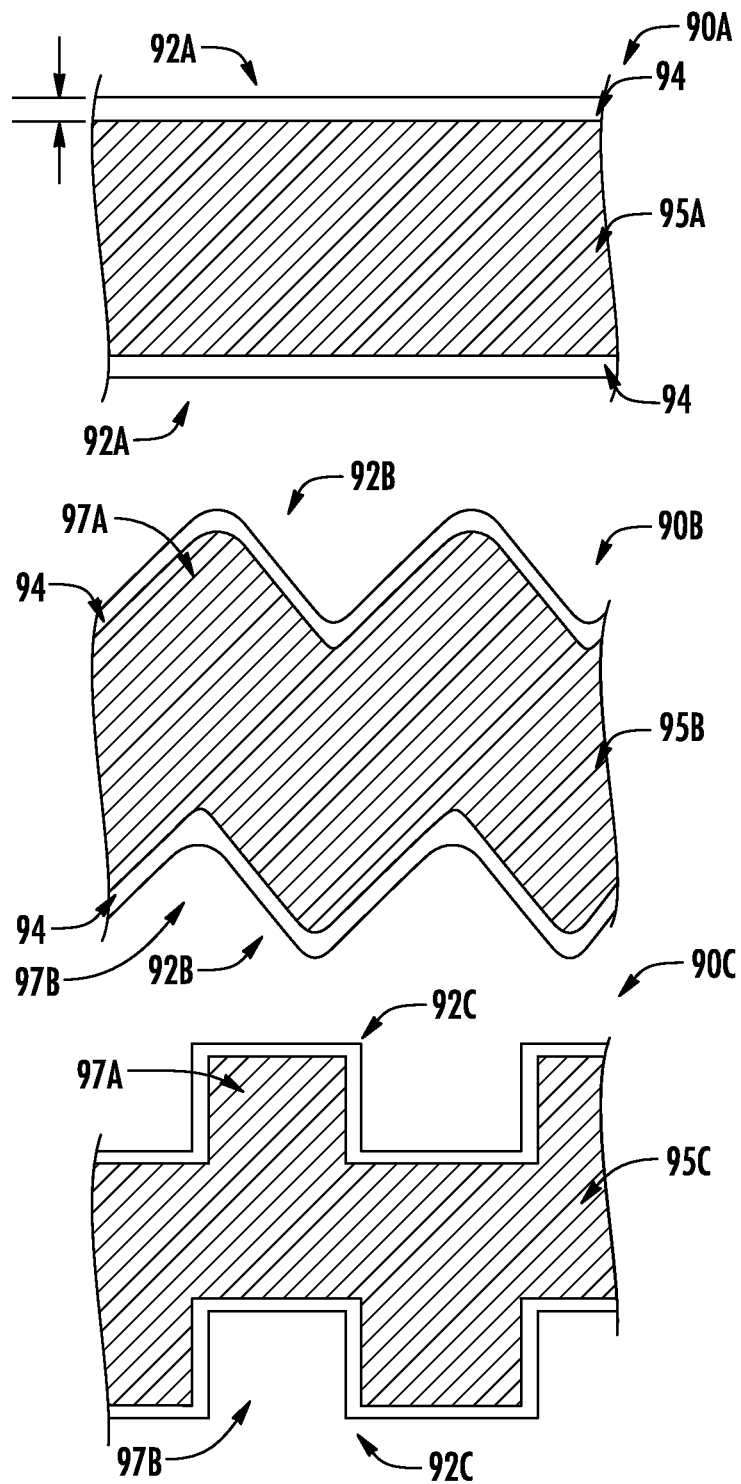
FIGS. 9A-9B illustrate sensing and heating mats according to implementations discussed herein.
Figure 9B:
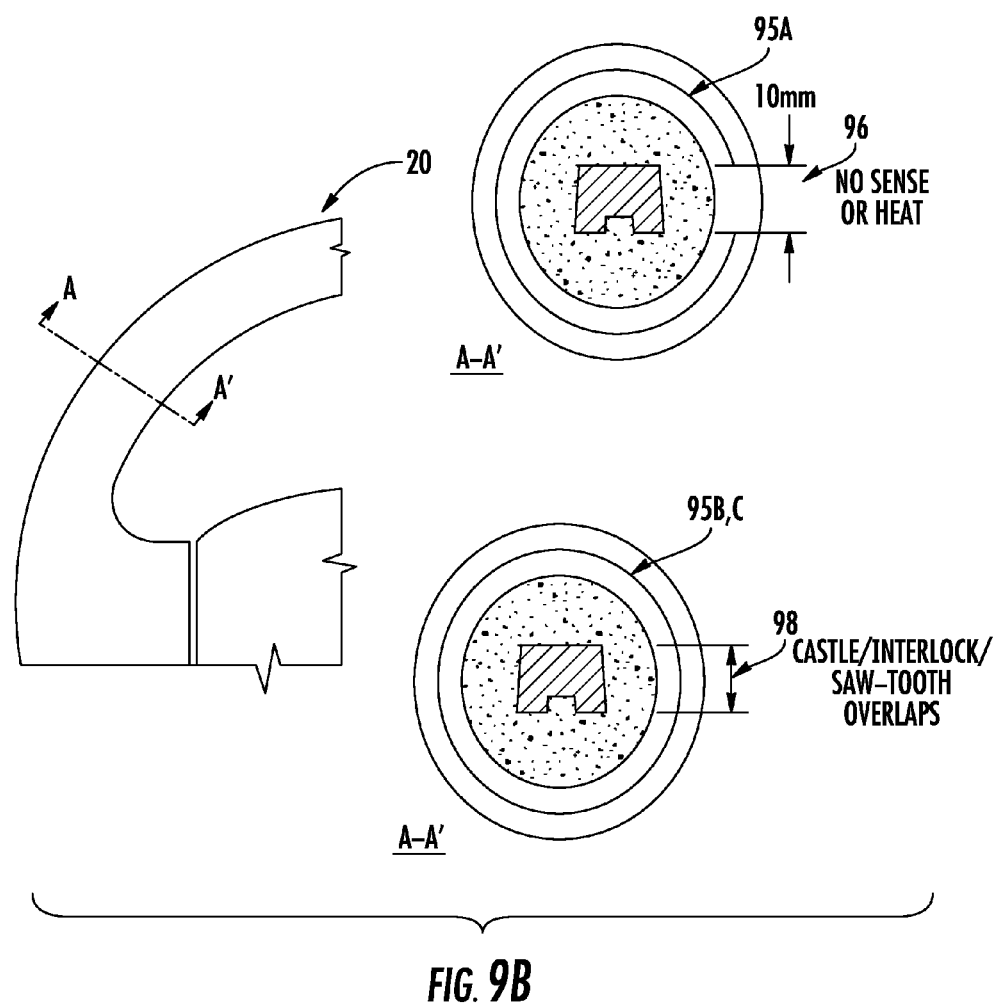

Referring now to FIG. 9A, plan views of portions of a plurality of sensor and/or heater mats are shown. The mats can be the sensor mats or the heater mats discussed in the examples of FIGS. 2A-8. For example, mat 90A illustrates a portion of a substantially rectangular mat. Opposing edges 92A of the mat 90A extend substantially in parallel. Additionally, the sensing or heating zone 95A of mat 90A is separated by a predetermined amount (e.g., a space 94) from at least one of the edges 92A. Optionally, the sensing or heating zone 95A of mat 90A is separated from at least one of the edges 92A by approximately 5 mm. It should be understood that the sensing or heating zone 95A of mat 90A can optionally be separated from at least one of the edges 92A by more or less than 5 mm. When the mat 90A is provided around a rim of a steering wheel, the spaces 94 provides a "dead zone" in which sensing/heating elements of the mat 90A are not arranged. Referring to FIG. 9B, a dead zone 96 is shown in the cross sectional view taken along line A-A' of a portion of a steering wheel 20. The mat 90A is not capable of sensing or providing heat within the dead zone 96. During the assembly process, the skin covering the rim of the steering wheel 20 can be stitched together in the dead zone 96 without damaging the sensing or heating zone 95A of the mat 90A.

Mats 90B and 90C illustrate portions of mats having an interlocking and/or interleaved area. Similarly to mat 90A, mats 90B, 90C can be the sensor mats or the heater mats discussed in the examples of FIGS. 2A-8. Mats 90B, 90C have sensing or heating zones 95B, 95C, respectively. Mat 90B includes opposing edges 92B defining a saw-tooth pattern. For example, mat 90B has corresponding protruding portions 97A and cut-away portions 97B. Mat 90C includes opposing edges 92C defining a castellated pattern. For example, mat 90C has corresponding protruding portions 97A and cut-away portions 97B. This disclosure contemplates that the mats can have opposing edges defining patterns other than saw-tooth and castellated patterns. When mats 90B, 90C are provided around a rim of a steering wheel, the protruding portions of the mats can extend into and provide sensing or heating capability in an interlocking area that corresponds to the dead zone described above. For example, protruding portions of each opposing edge can alternately extend into the interlocking area. Referring to FIG. 9B, an interlocking area 98 is shown in the cross sectional view taken along line A-A' of a portion of a steering wheel 20. By providing a mat having and interlocking and/or interleaved area, it is possible to reduce the spaces 94 between the sensing or heating zones 95B, 95C and the edges 92B, 92C.

The armature 40 may be covered with a covering or skin 42 that at least partially covers the armature 40. The skin 42 can optionally be provided over the one or more sensor mats 50 and the one or more heating mats 102. Because the one or more sensor mats 50 and the one or more heating mats 102 are separated by the second overmolded layer 85, wrapping, quality and process-related concerns with fitting the skin 42 over the sensor mats 50 and the heating mats 102 are eliminated. The skin 42 can be configured to provide an aesthetically pleasing exterior for the steering wheel 20. The skin 42 can also be configured to add an ergonomically pleasing layer to the outside of the steering wheel 20 to improve the comfort of the driver. According to an example, the skin 42 may be formed from an injection molded polyurethane material. According to other examples, the skin 42 may be formed from a wide variety of other molded materials, such as olefinic thermoplastic elastomers (TEOs), thermoplastic olefins (TPOs), thermoplastic elastomeric foam, rubber, or any other suitable material. According to other examples, the skin 42 may be a film or sheet which is wrapped around the armature, such as leather, fabric, a polymer material. According to other examples, the skin 42 may be a shell of laminate formed from a generally rigid material such as wood, a carbon fiber composite, etc. An underlay material such as a foam may be provided under the skin 42 to further increase the ergonomic comfort of the driver. The steering wheel 20 may have further components coupled to it such as appliques formed from materials (such as leather or wood), separate back covers, switches, bezels, etc.

While the system is described above as using a pressure sensitive material to measuring contact of one more two hands on the steering wheel, in other embodiments, different sensing means may be used. For example, the presence and positioning of hands on the steering wheel may be detected with capacitance or resistance-based sensors, as discussed above.

The sensor mat 50 may be configured to provide a binary signal to the processing system 52 (e.g., hands on or hands off) or may be able to provide an analog signal to the processing system 52 that describes the amount of pressure applied to the steering wheel 20, the rate of change of the pressure on the steering wheel, etc. If the sensor mat 50 provides an analog signal, the processing system 52 may be configured to react differently to, for example, a signal indicating that the pressure on the steering dropped quickly compared to a signal indicating that the pressure on the steering wheel dropped slowly. A quickly dropping pressure at one of the contact points may be interpreted to indicate that a hand was removed relatively quickly from the steering wheel 20 in a deliberate motion (e.g., to answer a mobile phone, to change a radio station, to shift gears, etc.). A slowly dropping pressure at one or two contact points, by contrast, may be interpreted to indicate that a hand was removed from the steering wheel slowly, which may be due to a drowsy driver, an inebriated driver, a driver suffering a medical episode, etc. The processing system 52 may be configured to then initiate a different warning response based on the speed with which a hand was removed from the steering wheel if the duration exceeds a predetermined limit.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGS. It should be noted that the orientation of various elements may differ according to other exemplary embodiments, and that such variations are intended to be encompassed by the present disclosure.

It is important to note that the construction and arrangement of the pressure sensing system for a steering wheel as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hand detection system, comprising:
   a steering wheel having a rim, the rim defining an inner region and an outer region along its surface;
   a sensor mat including a plurality of sensor loops arranged on a surface thereof, each of the sensor loops defining a sensing zone; and
   a control unit configured to detect a driver's hand pressing a portion of the steering wheel corresponding to one or more of the sensing zones,
   wherein:
      the sensor mat is disposed around at least a portion of the rim such that at least one sensor loop is arranged in the inner region of the rim and at least one sensor loop is arranged in the outer region of the rim,
      the at least one sensor loop arranged in the inner region comprises a first inner sensor loop,
      the at least one sensor loop arranged in the outer region comprises a first outer sensor loop and a second outer sensor loop, the first outer sensor loop and the second outer sensor loop are separate and spaced apart from each other in the outer region,
      a first portion of the first inner sensor loop and at least a portion of the first outer sensor loop are arranged on the rim such that a first cross sectional plane extends through the rim perpendicular to an axis of revolution of the rim and intersects the first portion of the first inner sensor loop and the portion of the first outer sensor loop,
      a second portion of the first inner sensor loop and at least a portion of the second outer sensor loop are arranged on the rim such that a second cross sectional plane extends through the rim perpendicular to the axis of revolution of the rim and intersects the second portion of the first inner sensor loop and the portion of the second outer sensor loop, and
      a center point of the sensing zone defined by the first inner sensor loop is positioned less than or equal to approximately 90 degrees with respect to a center point of each of the sensing zone defined by the first outer sensor loop and the sensing zone defined by the second outer sensor loop.

2. The hand detection system of claim 1, wherein the at least one sensor loop arranged in the inner region comprises two or more inner sensor loops, the two or more inner sensor loops being separate and arranged in a spaced apart pattern.

3. The hand detection system of claim 1, wherein each of the sensor loops defines a touch sensing zone.

4. The hand detection system of claim 1, wherein each of the sensor loops arranged in the outer region defines a swipe sensing zone.

5. The hand detection system of claim 1, wherein the first portion of the first inner sensor loop and the portion of the first outer sensor loop defines a first grip sensing zone, and the second portion of the first inner sensor loop and the second outer sensor loop define a second grip sensing zone.

6. The hand detection system of claim 1, wherein each of the sensor loops further comprises a conductive lead for communicating an electrical signal to the control unit.

7. The hand detection system of claim 6, wherein the conductive lead for at least one of the sensor loops is routed without extending into a portion of any of the sensing zones defined by any adjacent sensor loops.

8. The hand detection system of claim 7, wherein the conductive lead for the at least one of the sensor loops is the conductive lead for at least one of the sensor loops arranged in the outer region.

9. The hand detection system of claim 6, wherein the conductive lead for at least one of the sensor loops is routed through a portion of the sensing zone defined by an adjacent sensor loop, and at least a section of the conductive lead that is routed through the portion of the sensing zone comprises a shielding layer.

10. The hand detection system of claim 7, wherein the steering wheel further comprises:
    a hub for connection to a steering column of a vehicle;
    the rim extending around the hub; and
    a plurality of spokes connecting the hub and the rim, wherein the conductive lead for the at least one of the sensor loops is routed from the rim through an area where one of the spokes connects with the rim.

11. The hand detection system of claim 9, wherein the steering wheel further comprises:
    a hub for connection to a steering column of a vehicle;
    the rim extending around the hub; and
    a plurality of spokes connecting the hub and the rim, wherein the conductive lead for the at least one of the sensor loops is routed from the rim through an area where one of the spokes connects with the rim.

12. The hand detection system of claim 1, wherein the sensor mat comprises a pressure-sensitive material.

13. The hand detection system of claim 1, further comprising:
    at least one heater mat disposed around at least a portion of the rim; and
    at least one overmolded layer, wherein the overmolded layer is arranged between the at least one heater mat and the sensor mat.

14. The hand detection system of claim 13, wherein the at least one overmolded layer comprises a polyurethane foam.

15. The hand detection system of claim 13, wherein the at least one overmolded layer comprises a thermoplastic elastomeric foam.

16. The hand detection system of claim of claim 13, wherein the steering wheel further comprises:
   an armature defining the rim of the steering wheel; and
   a skin arranged around at least a portion of the armature, wherein the skin is arranged over at least one of the sensor mat and the at least one heater mat.

17. The hand detection system of claim 16, further comprising at least two overmolded layers, wherein a first overmolded layer is arranged between the sensor mat and the armature, and a second overmolded layer is arranged between the sensor mat and the at least one heater mat.

18. The hand detection system of claim 17, wherein at least one of the overmolded layers comprises a polyurethane foam.

19. The hand detection system of claim 17, wherein at least one of the overmolded layers comprises a thermoplastic elastomeric foam.

20. The hand detection system of claim 16, further comprising at least two overmolded layers, wherein a first overmolded layer is arranged between the at least one heater mat and the armature, and a second overmolded layer is arranged between the at least one heater mat and the sensor mat.

21. The hand detection system of claim 20, wherein at least one of the overmolded layers comprises a polyurethane foam.

22. The hand detection system of claim 20, wherein at least one of the overmolded layers comprises a thermoplastic elastomeric foam.

23. The hand detection system of claim 1, wherein the sensor mat has opposing edges defining alternating protruding and cut-away portions, the alternating protruding and cut-away portions of the opposing edges creating an interleaved area when the sensor mat is disposed around the rim.

24. The hand detection system of claim 23, wherein the opposing edges define at least one of a saw-tooth pattern and a castellated pattern.

25. A hand detection system, comprising:
   a steering wheel comprising an armature, the armature defining a rim of the steering wheel;
   a sensor mat defining at least one sensing zone, the sensor mat being arranged adjacent at least a portion of the armature;
   a heater mat defining at least one heating zone, the heater mat being arranged adjacent at least a portion of the armature;
   an overmolded layer arranged between the heater mat and the sensor mat; and
   a control unit configured to detect a driver's hand pressing a portion of the rim corresponding to the sensing zone,
   wherein the steering wheel further comprises a skin arranged around at least a portion of the armature and over at least one of the sensor mat and the heater mat.

26. The hand detection system of claim 25, wherein the overmolded layer is a first overmolded layer and further comprising a second overmolded layer, wherein the second overmolded layer is arranged between the heater mat and the armature.

27. The hand detection system of claim 1, wherein the inner region comprises an inner circumferential area of the steering wheel rim, and the outer region comprises an outer circumferential area of the steering wheel rim, wherein a radius from an axis of rotation of the steering wheel rim to the inner region is less than a radius from the axis of rotation of the steering wheel rim to the outer region.

28. The hand detection system of claim 1, wherein the inner region comprises a rear area of the steering wheel rim and the outer region comprises a front area of the steering wheel rim, the rear area of the rim being on a first side of a plane that extends through and includes the axis of revolution of the steering wheel rim and the front area being on a second, opposite side of the plane that extends through and includes the axis of revolution of the steering wheel rim.

29. The hand detection system of claim 25, wherein the overmolded layer is a first overmolded layer and further comprising a second overmolded layer, wherein the second overmolded layer is arranged between the sensor mat and the armature.

30. The hand detection system of claim 25, wherein the overmolded layer comprises a polyurethane foam or a thermoplastic elastomeric foam.

* * * * *